(12) United States Patent
Strutt (10) Patent No.: US 7,106,707 B1
(45) Date of Patent: Sep. 12, 2006

(54) SYSTEM AND METHOD FOR PERFORMING CODE AND FREQUENCY CHANNEL SELECTION FOR COMBINED CDMA/FDMA SPREAD SPECTRUM COMMUNICATION SYSTEMS

(75) Inventor: Guénael T. Strutt, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 878 days.

(21) Appl. No.: 10/022,281

(22) Filed: Dec. 20, 2001

(51) Int. Cl.
*H04B 7/216* (2006.01)
*H04B 7/00* (2006.01)
*H04Q 7/24* (2006.01)
*H04Q 7/40* (2006.01)
*H04L 12/66* (2006.01)

(52) U.S. Cl. .................. 370/329; 370/335; 370/338; 370/342; 455/450; 455/464; 455/509

(58) Field of Classification Search ........ 375/130–146; 370/320
See application file for complete search history.

(56) References Cited

U.S. PATENT DOCUMENTS

| | | | | |
|---|---|---|---|---|
| 4,494,192 A | 1/1985 | Lew et al. | ............... | 364/200 |
| 4,617,656 A | 10/1986 | Kobayashi et al. | ........... | 370/74 |
| 4,736,371 A | 4/1988 | Tejima et al. | ............... | 370/95 |
| 4,742,357 A | 5/1988 | Rackley | ............... | 342/457 |
| 4,747,130 A | 5/1988 | Ho | ............... | 379/269 |
| 4,910,521 A | 3/1990 | Mellon | ............... | 342/45 |
| 5,034,961 A | 7/1991 | Adams | ............... | 375/130 |
| 5,068,916 A | 11/1991 | Harrison et al. | ............... | 455/39 |
| 5,231,634 A | 7/1993 | Giles et al. | ............... | 370/95.1 |
| 5,233,604 A | 8/1993 | Ahmadi et al. | ............... | 370/60 |
| 5,241,542 A | 8/1993 | Natarajan et al. | .......... | 370/95.3 |
| 5,317,566 A | 5/1994 | Joshi | ............... | 370/60 |
| 5,392,450 A | 2/1995 | Nossen | ............... | 455/12.1 |
| 5,412,654 A | 5/1995 | Perkins | ............... | 370/94.1 |
| 5,424,747 A | 6/1995 | Chazelas | ............... | 342/70 |
| 5,502,722 A | 3/1996 | Fulghum | ............... | 370/69.1 |
| 5,517,491 A | 5/1996 | Nanni et al. | ............... | 370/29 |

(Continued)

FOREIGN PATENT DOCUMENTS

CA  2132180  3/1996

(Continued)

OTHER PUBLICATIONS

A.R. Rahgavan and Carl W. Baum, "An unslotted multi channel-access protocol for distributed direct-sequemce networks", Baltzer Science Publishers, Mobile Networks and Applications 5 (2000) 49-56.*

(Continued)

*Primary Examiner*—Wellington Chin
*Assistant Examiner*—Melanie Jagannathan
(74) *Attorney, Agent, or Firm*—Randi L. Karpinia; Joseph J. Buczynski (57) ABSTRACT

A system and method for maximizing channel utilization by efficiently allocating codes and frequencies based on estimated relative interference between subscriber units in a wireless communications network, such as an ad-hoc wireless communications network, in such a way as to minimize multiple access interference. The system and method perform the operations of collecting existing and proposed transmission information between nodes in the network, and calculating a respective interference factor for each existing transmission between certain nodes and each proposed transmission by a transmitting node. The interference factors can be calculated based on, for example, respective distances between certain nodes. The system and method then assign the communications channel configuration, including a frequency channel and code channel, to the transmitting node for communications to other nodes as designated by a minimum of the calculated respective interference factors.

15 Claims, 6 Drawing Sheets

U.S. PATENT DOCUMENTS

| | | | | |
|---|---|---|---|---|
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,974,327 | A * | 10/1999 | Agrawal et al. | 455/452.2 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,128,500 | A | 10/2000 | Raghavan et al. | 455/453 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,229,796 | B1 | 5/2001 | Dent | 370/355 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,480,497 | B1 * | 11/2002 | Flammer et al. | 370/400 |
| 2001/0053699 | A1 | 12/2001 | McCrady et al. | 455/513 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Arvind R. Raghavan entitled "An Unslotted Multichannel Channel-Access Protocol For Distributed Direct Sequence Networks", *Mobile Networks and Applications*, vol. 5, pp. 49-56 (2000).

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G.Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual USCD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Acevers, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

-PRIOR ART-

*FIG. 1*

-PRIOR ART-

SYSTEM AND METHOD FOR PERFORMING CODE AND FREQUENCY CHANNEL SELECTION FOR COMBINED CDMA/FDMA SPREAD SPECTRUM COMMUNICATION SYSTEMS

BACKGROUND OF THE INVENTION

1. Field of the Invention

The present invention relates to a system and method for assigning protocols for reuse of frequencies and codes in a wireless communication system utilizing spread spectrum technology. More particularly, the present invention relates to a system and method for maximizing channel utilization by efficiently allocating codes and frequencies based on estimated relative interference between subscriber units in a wireless communications network, such as an ad-hoc wireless communications network.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network includes a plurality of interconnected base stations that are distributed geographically at designated locations throughout the service area. Each base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets or frames. As can be appreciated by one skilled in the art, the transceiver and user terminals transmit and receive the data frames in multiplexed format, such as time-division multiple access (TDMA) format, code-division multiple access (CDMA) format, or frequency-division multiple access (FDMA) format, which enables a single transceiver at the base station to communicate simultaneously with several user terminals in its coverage area.

In addition, in a cellular wireless system, the base stations typically communicate with the user terminals over channels. The channel resources are assigned in order to limit interference between units and thus, minimize collisions between signals. The word "collision" will hereafter refer to the presence of two code/frequency combinations in the same geographical area that renders communication between units using such combinations ineffective, thus indicating that a better code/frequency combination should have been selected instead. In a Global System for Mobile Communications (GSM) network, for instance, frequencies are assigned to specific cell towers, allowing for a large-scale reuse pattern to take place. In CDMA/IS-95, spreading codes are dynamically assigned by the cell tower to neighboring units.

In general, in networks employing handheld multimedia terminals (HMT) as discussed below, conventional practice in performing collision avoidance was to simply verify whether a channel was used or not, which is also referred to as "carrier sensed/collision avoidance". To overcome problems when collision could not be avoided, a different spreading code was chosen using the address of the desired receiving unit. Unfortunately, this code-planning technique only mitigated interference from other units, without taking advantage of the intrinsic properties of spreading codes.

Figure 1:
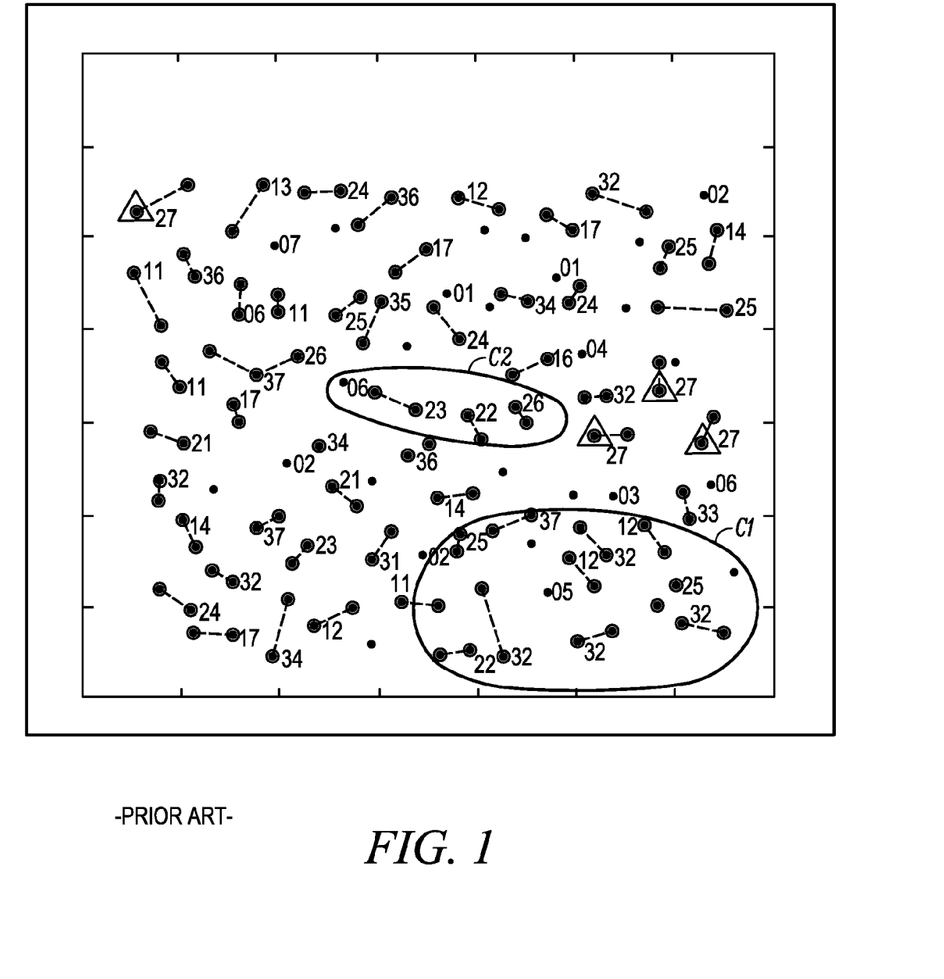
FIG. 1 is a conceptual diagram illustrating a wireless communications network configuration in which channel utilization is determined based on a frequency collision threshold technique.

FIG. 1 is a conceptual diagram illustrating a first network configuration in which channel utilization is determined based on a technique which will be hereafter referred to as "frequency collision threshold". Each unit (displayed as a darkened circle within a second circle) includes a transceiver that is associated with a code/frequency pair. The number "ab" associated with each transceiver corresponds to the code/frequency pair assigned to each transceiver, in which "a" is the frequency (1 through 3) and "b" is the code (1 through 7). A 0 indicates that none (either frequency and/or code) is available. In certain cases, the interference will be such that no transmission will be possible without critically affecting other transmissions. In this event, the unit will elect not to transmit.

In a traditional carrier sense multiple access/collision avoidance (CSMA/CA) system, each unit is able to determine if a frequency channel is available. A "frequency collision threshold" method is designed to prevent units from reusing the same frequency channel at the same time when the amount of interference created would prevent successful communication from occurring. The threshold used in such a method would be selected in such a way that interference can still be mitigated by the use of different spreading codes. The advantage over a standard CSMA/CA system therefore resides in a greater channel utilization, since frequency channel resources are used more frequently as the frequency collision threshold is lowered.

Figure 2:
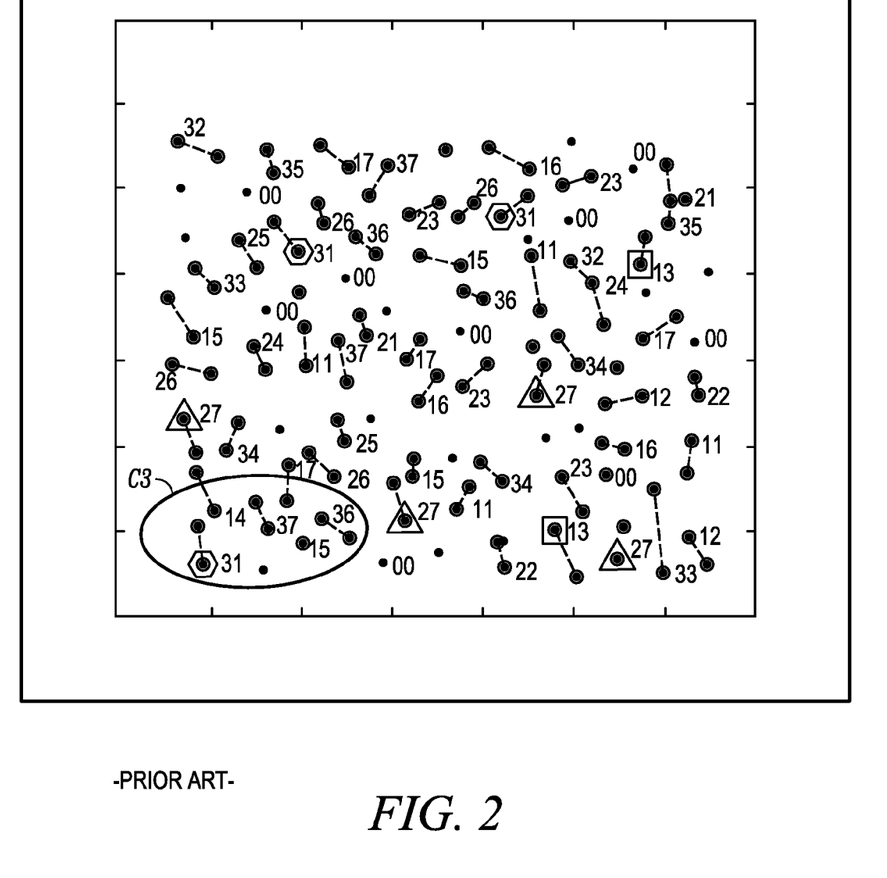
FIG. 2 is a conceptual diagram illustrating a wireless communications network configuration in which channel utilization is determined based on a code/frequency collision threshold technique.

As can be appreciated by one skilled in the art, common pathologies for the "frequency collision threshold" technique include code/frequency-reuse collisions. That is, as indicated in the circled area C1, there are four scheduled transmission using the "32" code/frequency pair. Also, another pathology is extensive frequency collisions, as indicated in the circled area C2, where code/frequency pairs "23", "22" and "26" are inadequately located one next to another. To prevent such undesirable situations from occurring, one could increase the threshold. However, the outcome would be a dramatic reduction in network capacity as more units become unable to transmit for lack of available frequency channels. FIG. 2 therefore illustrates a second network configuration in which channel utilization is determined based on another technique which will hereafter be referred to as "code/frequency collision threshold". The numbering and other terminology shown in FIG. 2 uses the same convention as that shown in FIG. 1 as discussed above.

The code/frequency collision threshold technique is similar to the "frequency collision threshold" technique demonstrated in FIG. 1, because it also probes the channel to prevent frequency collisions from occurring, yet also performs the same analysis for code collisions. Since codes do not usually provide sufficient processing gain to compensate for a lack of frequency separation, the threshold used to avoid code collisions is significantly higher than the one used to avoid frequency collisions. Thus, units using the same code/frequency pair are likely to be geographically further apart from one another. This phenomenon is illustrated in FIG. 2 with the triangles highlighting code/frequency pair "27", squares highlighting the code/frequency pair "13", and hexagons highlighting the code/frequency pair "31".

However, other pathologies remain unresolved. For example, frequency reuse is far from optimized as indicated in circled area C3 in FIG. 2 (i.e., frequency 2 could be advantageously used in area C3). Accordingly, as can be appreciated from the above examples, a threshold approach cannot resolve these issues because it does not make judicious decisions; it only prevents catastrophic situations from occurring.

Other known techniques are also available for allocating channels. For example, one technique is described in a document by Arvind R. Raghavan entitled "An Unslotted Multichannel Channel-Access Protocol For Distributed Direct Sequence Networks", *Mobile Networks and Applications*, Vol. 5, pp. 49–56 (2000), the contents of which is herein incorporated by reference. Specifically, this document describes a fully-connected system in which transceivers can transmit or receive on one frequency channel at a time. Transceivers monitor each frequency channel to ensure that they are appropriately used. Since each transceiver is given only one code, there is no possibility of "code-collision". However, the question arises in a non-fully connected system as to what criterion may be used to prioritize the use of specific code/frequency pairs.

Other techniques for allocating channels in a communications network are also described in U.S. Pat. No. 6,229,796 to Dent, and in U.S. Pat. No. 6,128,500 to Rhaghavan et al., the entire contents of both being incorporated herein by reference. The Dent patent describes a method to allocate code, frequency and time slots in an optimal way for cellular systems. However, this method is entirely static and therefore makes assumptions about the geometry of the infrastructure which is not compatible with a self-forming ad hoc network. The Rhaghavan et al. patent provides an adaptive method to increase capacity in a cellular system, but it only modifies cell boundaries based on a measure of interference. It is not implementable in a self-forming network where there are no fixed base stations.

That is, in recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

As with conventional wireless networks discussed above, it can be necessary to allocate frequency and code channels to the nodes via which the nodes communicate with each other. It is also therefore necessary for these channels to be allocated in such a manner as to limit interference between neighboring nodes while also avoiding collision between signals transmitted by the nodes. Thus, a need exists to provide an improved systematic methodology for allocating channels in a communications network, in particular, a wireless ad-hoc communications network, which selects a code/frequency pair for communication between two nodes in the network in such a way that multiple access interference is minimized.

SUMMARY OF THE INVENTION

An object of the present invention is to provide a system and method for assigning protocols for reuse of frequencies and codes in a wireless communication system utilizing spread spectrum technology.

Another object of the present invention is to provide a system and method for maximizing channel utilization by efficiently allocating codes and frequencies based on estimated relative interference between subscriber units in a wireless communications network, such as an ad-hoc wireless communications network.

A further object of the present invention is to provide a system and method that uses a systematic methodology to select code and frequency pairs for use for communication between nodes in an ad-hoc communications network in such a way to minimize multiple access interference.

These and other objects are substantially achieved by providing an improved system and method for allocating communication channel configurations including code/frequency pairs in an ad-hoc network using spread spectrum modulation. The system and method perform the operations of collecting existing and proposed transmission information between nodes in the network, and calculating a respective interference factor for each existing transmission between certain nodes and each proposed transmission by a transmitting node. The interference factors can be calculated based on, for example, respective distances between the certain nodes. The system and method then assign the communication channel configuration, including a frequency channel and a code channel, to the transmitting node for communications to other nodes as designated by a minimum of the calculated respective interference factors.

BRIEF DESCRIPTION OF THE DRAWINGS

The invention, as well as other features and advantages thereof will be best understood by reference to the detailed description of the preferred embodiment which follows, when read in conjunction with the accompanying drawings, in which.

DETAILED DESCRIPTION OF THE PREFERRED EMBODIMENTS

Figure 3:
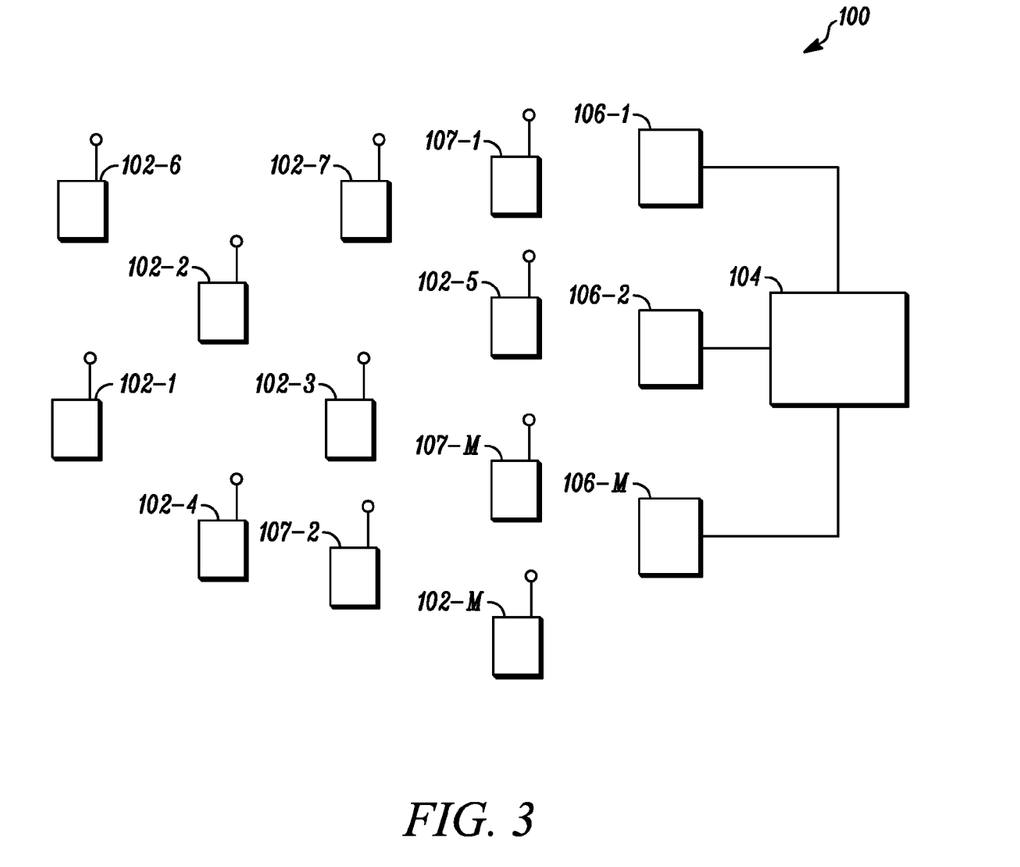
FIG. 3 is a block diagram of an example of an ad-hoc packet-switched wireless communications network employing a system and method for allocating codes and frequencies to nodes for communication according to an embodiment of the present invention.

FIG. 3 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . , 106-n (referred to generally as nodes 106 or access points 106), for providing the nodes 102 with access to the fixed network 104. The fixed network 104 includes, for example, a core local access network (LAN), and a plurality of servers and gateway routers, to thus provide the nodes 102 with access to other networks, such as the public switched telephone network (PSTN) and the Internet. The network 100 further includes a plurality of fixed routers 107-1 through 107-1 (referred to generally as nodes 107) that are capable of routing data packets to other nodes 102, 106 or 107.

Figure 4:
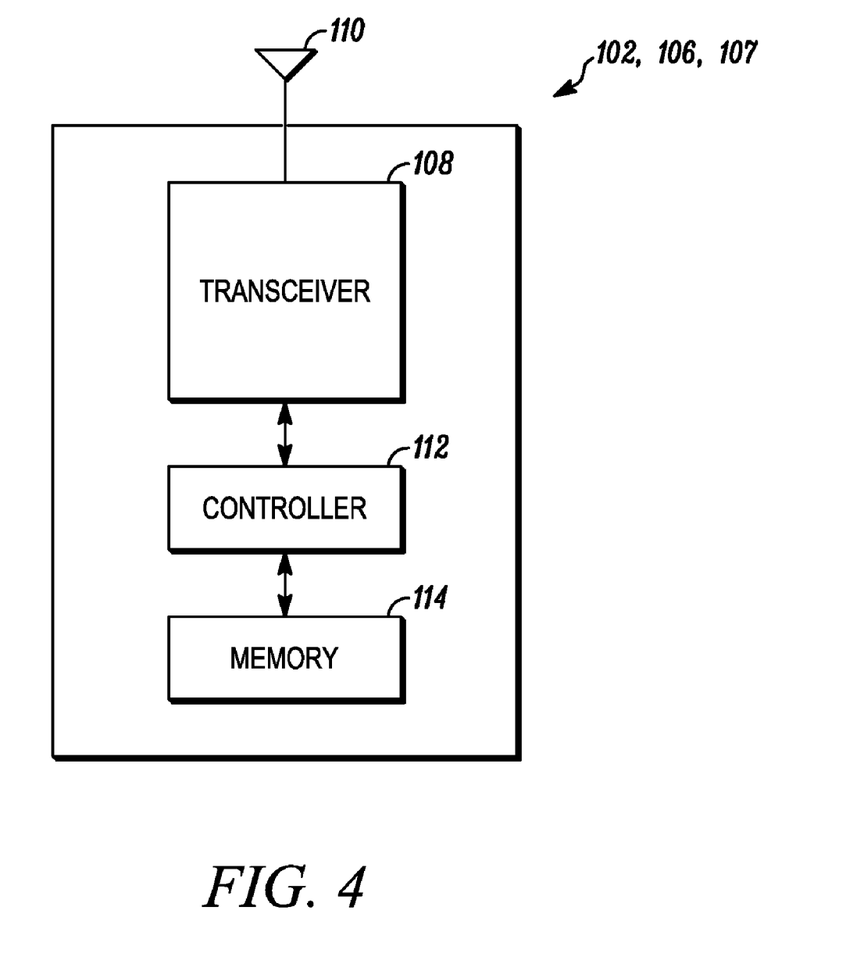
FIG. 4 is a block diagram illustrating an example of components of a node employed in the network shown in FIG. 3.

As can be appreciated by one skilled in the art, the nodes 102, 106, 107 are capable of communicating with each other directly, or via one or more other nodes 102 operating as a router or routers for data packets being sent between nodes 102, 106 or 107, as described in U.S. Pat. No. 5,943,322 to Mayor and in U.S. patent application Ser. Nos. 09/897,790, 09/815,157 and 09/815,164, referenced above. Specifically, as shown in FIG. 4, each node 102, 106, 107 includes a transceiver 108 which is coupled to an antenna 110 and is capable of receiving and transmitting signals, such as packetized data signals, to and from the node 102, 106, 107, under the control of a controller 112. The packetized data signals can include, for example, voice, data or multimedia.

Each node 102, 106, 107 further includes a memory 114, such as a random access memory (RAM), that is capable of storing, among other things, routing information pertaining to itself and other nodes 102, 106, 107 in the network 100. The nodes 102, 106, 107 exchange their respective routing information, referred to as routing advertisements or routing table information, with each other via a broadcasting mechanism periodically, for example, when a new node 102 enters the network 100, or when existing nodes 102 in the network 100 move. A node 102, 106, 107 will broadcast its routing table updates, and nearby nodes 102, 106, 107 will only receive the broadcast routing table updates if within radio frequency (RF) range of the broadcasting node 102, 106, 107. Each of the nodes 102, 106, 107 that receive the routing table information from a neighboring node 102, 106, 107 can store all or a relevant portion of that routing table information in their respective memory 114. The routing advertisements that are transmitted to other nodes through regular broadcasts may contain additional information such as position, measured path loss or any criterion that may be used to estimate the amount of interference that a unit will generate in the network.

Figure 5:
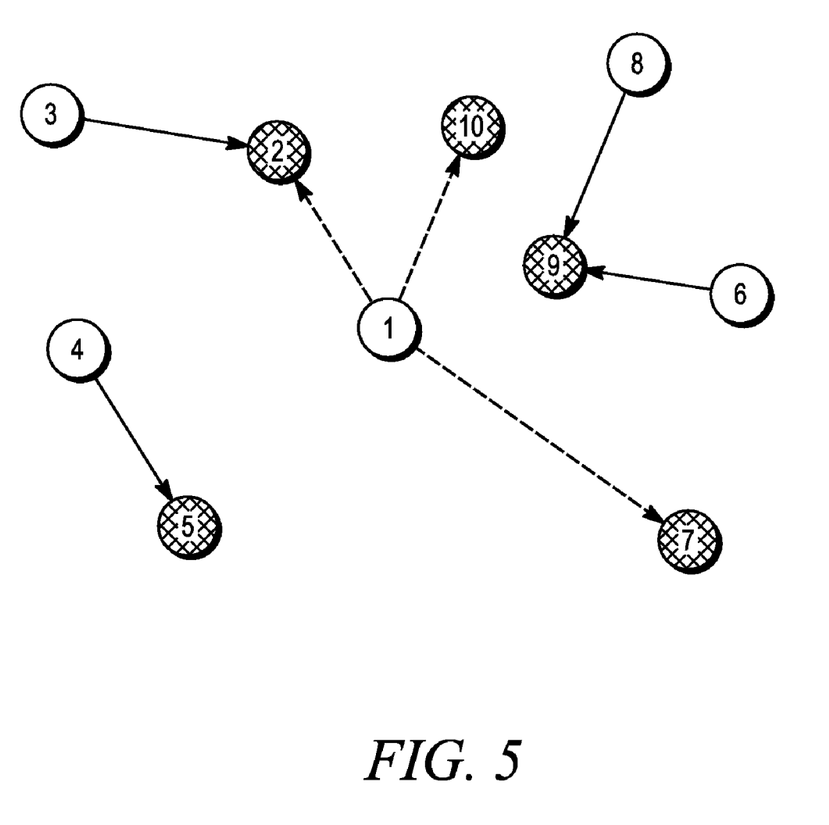
FIG. 5 illustrates a conceptual diagram of a plurality of nodes in the network shown in FIG. 3 that are communicating with each other and for which codes and frequencies are allocated according to an embodiment of the present invention.

FIG. 5 is a conceptual diagram which will now be used to demonstrate a manner in which a system and method according to an embodiment of the invention operates in network 100. For purposes of this discussion, five nodes of the network 100, which can be any of nodes 102, 106 or 107 are acting as transmitters and are identified as transmitters ①, ③, ④, ⑥, and ⑧ and five other nodes, which can also be any of nodes 102, 106 or 107 are acting as potential receivers and are identified as receivers ❷, ❺, ❼, ❾ and ❿. Four of the transmitters ③, ④, ⑥ and ⑧ have already scheduled transmissions in the same time slot (timing issues are not relevant since transmissions are assumed to be concurrent in time, thereby inducing maximum interference) represented by the solid lines with arrows. Transmitter ① is planning transmissions to receivers ❷, ❼ and ❿, as indicated by the dashed lines with arrows.

Table 1 below shows the relative interference between existing and proposed links and, in particular, indicates the effects of interference in transmission from transmitter ①. The "IN" column indicates the amount of incoming interference, that is, the interference that the scheduled transmissions would cause on the attempted transmission. The "OUT" column indicates the amount of outgoing interference, that is, the interference that the attempted transmission would cause on the scheduled transmissions.

TABLE 1

Relative Interference Between Planned Links

| Interference Table for Unit ① | | | | Attempted Transmission To: | | | | | |
| --- | --- | --- | --- | --- | --- | --- | --- | --- | --- |
| | | | | ❼ | | ❿ | | ❷ | |
| FROM | TO | FREQ | CODE | IN | OUT | IN | OUT | IN | OUT |
| ③ | ❷ | 1 | 7 | 0.323 | 0.016 | 0.138 | 0.646 | 1.000 | 1.000 |
| ④ | ❺ | 3 | 6 | 1.231 | 0.846 | 1.256 | 0.159 | 0.089 | 0.045 |
| ⑥ | ❾ | 2 | 1 | 1.123 | 0.648 | 2.486 | 1.345 | 0.130 | 0.189 |
| ⑧ | ❾ | 2 | 2 | 0.687 | 0.564 | 0.237 | 0.984 | 0.018 | 0.020 |

On the left hand side of the table, four existing transmissions are recorded, together with the code/frequency pair they are using. It should be noted that this method can be used regardless of whether multiple transmissions can originate from or be received by the same node. For example, transmitter ① may or may not be able to transmit to receiver ❷, and receiver ❾ may or may not receive messages from transmitters ⑥ and ⑧ simultaneously.

On the right hand side of Table 1 are potential transmissions or, in other words, those which are present in the transmit buffer of transmitter ①, shown as dashed lines in FIG. 5. That is, in Table 1, these are potential transmissions from transmitter ① to receivers ❷, ❼ and ❿. The controller 112 of the node that makes the decision (the "deciding node") on which code/frequency pair to use calculates the estimated interference values. As can be appreciated by one skilled in the art, the receiving terminal in a CSMA/CA system traditionally decides what code/frequency pair that the terminal about to transmit to it should use. However, in a multicast addressing system, the transmitter can determine which code/frequency pair to use for transmission.

There are several methods in which the deciding node can calculate estimated interference values. For example, the deciding node may use the relative distances between transceivers to calculate estimated interference values. Alternatively, the deciding node may calculate estimated interference values based on the estimated received power from transmitters, as long as power control is used and path loss is measured. In either case, the estimated interference factor at a given node is a measure of the estimated power received by this node from another node which has adjusted its output power.

In one example, for a scenario where A transmitting to B affects a transmission from C to D, the interference factor is determined to be the ratio of the square of the distance between A and B by the square of the distance between A and D. It is noted that the square of the distance accounts for propagation loss and assumes unity power received regardless of the distance or, in other words, power control is assumed to work perfectly. For example, transmission between transmitter ③ to receiver ❷ will affect transmissions from transmitter ① to receiver ❼ by a factor of the square of the distance between transmitter by a factor of $d(③,❷)^2/d(③,❼)^2=0.323$, as indicated in Table 1 above. The formula for the OUT value is the same. "IN" corresponds to (for example) the interference caused by the transmission from ③ to ❷ on the transmission from ① to ❼. "OUT" corresponds to (for example) the interference caused by the transmission from ① to ❼ on the transmission from ③ to ❷. The interference factor would thus be $d(①,❼)^2/d(①,❷)^2$. Interference factor calculations (such as those presented in the current example) can be summarized using the following equations:

Equation for interference factor calculations     Equation 1

Interference factor (IN) =

$$\frac{(\text{dist. between scheduled } T_x \text{ and scheduled } R_x)^2}{(\text{dist. between scheduled } T_x \text{ and tentative } R_x)^2}$$

Interference factor (OUT) =

$$\frac{(\text{dist. between tentative } T_x \text{ and tentative } R_x)^2}{(\text{dist. between tentative } T_x \text{ and scheduled } R_x)^2}$$

The estimated interference factor should also be qualified by the nature of the transmission. For example, if the same frequency or code channel is used, interference will be proportionally higher. Thus, interference coefficients can be used to account for such differences, as indicated in Table 2 below.

TABLE 2

Interference Coefficient For Code/Frequency Reuse

| SAME FREQUENCY | SAME CODE | INTERFERENCE COEFFICIENT |
|---|---|---|
| ✓ | ✓ | $\gamma_s = 1$ |
| ✓ | ✗ | $\gamma_f = .25$ (ca. 6 dB) |
| ✗ | ✓/✗ | $\gamma_n = .0025$ (ca. 26 dB) |

It should be noted that $\gamma_s$ is always equal to one as it corresponds to the case where interference is maximized. Coefficient $\gamma_f$ is, however, a function of the code division multiple access (CDMA) spreading gain for the system considered, while coefficient $\gamma_n$ is related to adjacent channel interference, dependent on filtering properties. Using information in Table 1, it is possible for the controller 112 of a node 102, 106 or 107 to calculate the estimated interference generated by itself that is received by other nodes 102, 106 or 107 for every code/pair possibility. Results for an initial interference factor of 0.323 in Table 1 which is multiplied by the above coefficients as appropriate are set forth in Table 3 below.

TABLE 3

Interference Factor For Each Code/Frequency Pair (one link only)

| Freq/Code | 1 | 2 | 3 | 4 | 5 | 6 | 7 |
|---|---|---|---|---|---|---|---|
| 1 | 8.07E-2 | 8.07E-2 | 8.07E-2 | 8.07E-2 | 8.07E-2 | 8.07E-2 | 3.23E-1 |
| 2 | 8.07E-4 | 8.07E-4 | 8.07E-4 | 8.07E-4 | 8.07E-4 | 8.07E-4 | 8.07E-4 |
| 3 | 8.07E-4 | 8.07E-4 | 8.07E-4 | 8.07E-4 | 8.07E-4 | 8.07E-4 | 8.07E-4 |

When a node 102, 106, 107 attempts transmission, its controller 112 must consider every neighboring node 102, 106, 107 when calculating the overall interference. This is shown in Table 4 below for two other simultaneous transmissions. To simplify Table 4, is it assumed that the transmissions from transmitter ⑥ to receiver ❾ and from transmitter ⑧ to receiver ❾ in Table 1 do not occur simultaneously with the attempted transmission from transmitter ① to receiver ❼, otherwise, their associated values shown in Table 1 would need to be included in Table 4 as well.

TABLE 4

Final interference factor estimation for one attempted transmission

| Interference Table for Unit ① | | | | Attempted Transmission to ❼ |||||||
|---|---|---|---|---|---|---|---|---|---|---|
| | | | | | IN |||||||
| FROM | TO | FREQ | CODE | F/C | 1 | 2 | 3 | 4 | 5 | 6 | 7 |
| ③ | ❷ | 1 | 7 | 1 | 8.07E-2 | 8.07E-2 | 8.07E-2 | 8.07E-2 | 8.07E-2 | 8.07E-2 | 3.23E-2 |
| | | | | 2 | 8.07E-4 | 8.07E-4 | 8.07E-4 | 8.07E-4 | 8.07E-4 | 8.07E-4 | 8.07E-4 |
| | | | | 3 | 8.07E-4 | 8.07E-4 | 8.07E-4 | 8.07E-4 | 8.07E-4 | 8.07E-4 | 8.07E-4 |
| ④ | ❺ | 3 | 6 | 1 | 3.08E- | 3.08E- | 3.08E- | 3.08E- | 3.08E- | 3.08E- | 3.08E- |

TABLE 4-continued

| | | | | | | | | |
|---|---|---|---|---|---|---|---|---|
| | | 2 | 3.08E-3 | 3.08E-3 | 3.08E-3 | 3.08E-3 | 3.08E-3 | 3.08E-3 | 3.08E-3 |
| | | 3 | 3.08E-1 | 3.08E-1 | 3.08E-1 | 3.08E-1 | 3.08E-1 | 3.08E-0 | 3.08E-1 |

Attempted Transmission to ⑦

| | | | OUT | | | | | |
|---|---|---|---|---|---|---|---|---|
| | | 1 | 4E-3 | 4E-3 | 4E-3 | 4E-3 | 4E-3 | 4E-3 | 1.6E-2 |
| | | 2 | 4E-5 | 4E-5 | 4E-5 | 4E-5 | 4E-5 | 4E-5 | 4E-5 |
| | | 3 | 4E-5 | 4E-5 | 4E-5 | 4E-5 | 4E-5 | 4E-5 | 4E-5 |
| | | 1 | 2.11E-3 | 2.11E-3 | 2.11E-3 | 2.11E-3 | 2.11E-3 | 2.11E-3 | 2.11E-3 |
| | | 2 | 2.11E-3 | 2.11E-3 | 2.11E-3 | 2.11E-3 | 2.11E-3 | 2.11E-3 | 2.11E-3 |
| | | 3 | 2.11E-1 | 2.11E-1 | 2.11E-1 | 2.11E-1 | 2.11E-1 | 8.46E-1 | 2.11E-1 |
| | | 1 | 6.11E-3 | 6.11E-3 | 6.11E-3 | 6.11E-3 | 6.11E-3 | 6.11E-3 | 6.11E-3 |
| | | 2 | 2.15E-3 | 2.15E-3 | 2.15E-3 | 2.15E-3 | 2.15E-3 | 2.15E-3 | 2.15E-3 |
| | | 3 | 2.11E-1 | 2.11E-1 | 2.11E-1 | 2.11E-1 | 2.11E-1 | 8.46E-1 | 2.11E-1 |
| SUM | | 1 | 8.38E-2 | 8.38E-2 | 8.38E-2 | 8.38E-2 | 8.38E-2 | 8.38E-2 | 3.54E-2 |
| | | 2 | 3 9E 3 | 3.9E-3 | 3.9E-3 | 3.9E-3 | 3.9E-3 | 3.9E-3 | 3.9E-3 |
| | | 3 | 3.09E-1 | 3.09E-1 | 3.09E-1 | 3.09E-1 | 3.09E-1 | 1.23E-0 | 3.09E-1 |
| | F/C | 1 | 2 | 3 | 4 | 5 | 6 | 7 | |
| FINAL RESULT (sum of IN and OUT) | | 1 | 8.99E-2 | 8.99E-2 | 8.99E-2 | 8.99E-2 | 8.99E-2 | 8.99E-2 | 8.99E-2 |
| | | 2 | 6E-3 | 6E-3 | 6E-3 | 6E-3 | 6E-3 | 6E-3 | 6E-3 |
| | | 3 | 5.20E-2 | 5.20E-2 | 5.20E-2 | 5.20E-2 | 5.20E-2 | 2.08E-2 | 5.20E-2 |

It should be noted that the set of values in the "SUM" section are equal to the sums of the respective set of values in the above two sections. For example, the value of 8.38E-2 (which is interpreted as $8.38*10^{-2}$) in row 1, column 1, of the "IN" portion of the "SUM" section is equal to the sum of the value 8.07E-2 in row 1, column 1, of the "IN" portion showing the interference for transmission from transmitter ③ to receiver ❷ on frequency channel 1, code channel 7, and the value 3.08E-3 in row 1, column 1, of the "IN" portion showing the interference for transmission from transmitter ④ to receiver ❺ on frequency channel 3, code channel 7.

For each possible code/frequency pair, the system determines how much incoming and outgoing interference would be generated if this code/frequency pair was to be used concurrently with other code/frequency pairs that neighboring units are scheduled to use. The final result is used to determine the best possible code/frequency pair combinations by selecting the lowest available interference value, which corresponds to the impact of the current transmission on overall Multiple Access Interference (MAI). The values in the FINAL RESULT section are equal to the sum of the values in the rows and columns of the "IN" portion of the SUM section and the values in the corresponding rows and columns of the "OUT" portion of the SUM section. For example, the value 8.99E-2 in row 1, column 1 of the FINAL RESULT section is equal to the value of 8.38E-2 in row 1, column 1 of the "IN" portion of the SUM section plus the value of 6.11E-3 in row 1, column 1 of the "OUT" portion of the SUM section. In the present scenario, the obvious result is that frequency 2 with any code 1 through 7 should be used, because the estimated interference is 6E-3 for any code.

Although the interference calculation method presented herein only provides a measure of the impact of a tentative transmission on overall MAI by summing individual interference factors (weighted by interference coefficients), a different mathematical combination of individual interference factors may also be used. For example, packets minimizing outgoing interference (instead of both outgoing and incoming interference) may be given priority by applying a greater weight to the outgoing interference factors.

In addition, regardless of whether concurrent transmissions originating from the current unit are possible or not, this methodology is also a means of prioritizing data packets in a queue in, for example, the memory 114 of a node 102, 106, 107, with the most favorable data packets being sent first. It is also possible to group those that may be transmitted at the same time when a multicast addressing mode is considered.

As will now be discussed, a simulation was run to determine how the algorithm performs in dense geometries where frequency/code collisions are very likely to occur. It also provides a means to compare the effectiveness of this method with previous implementations.

Figure 6:
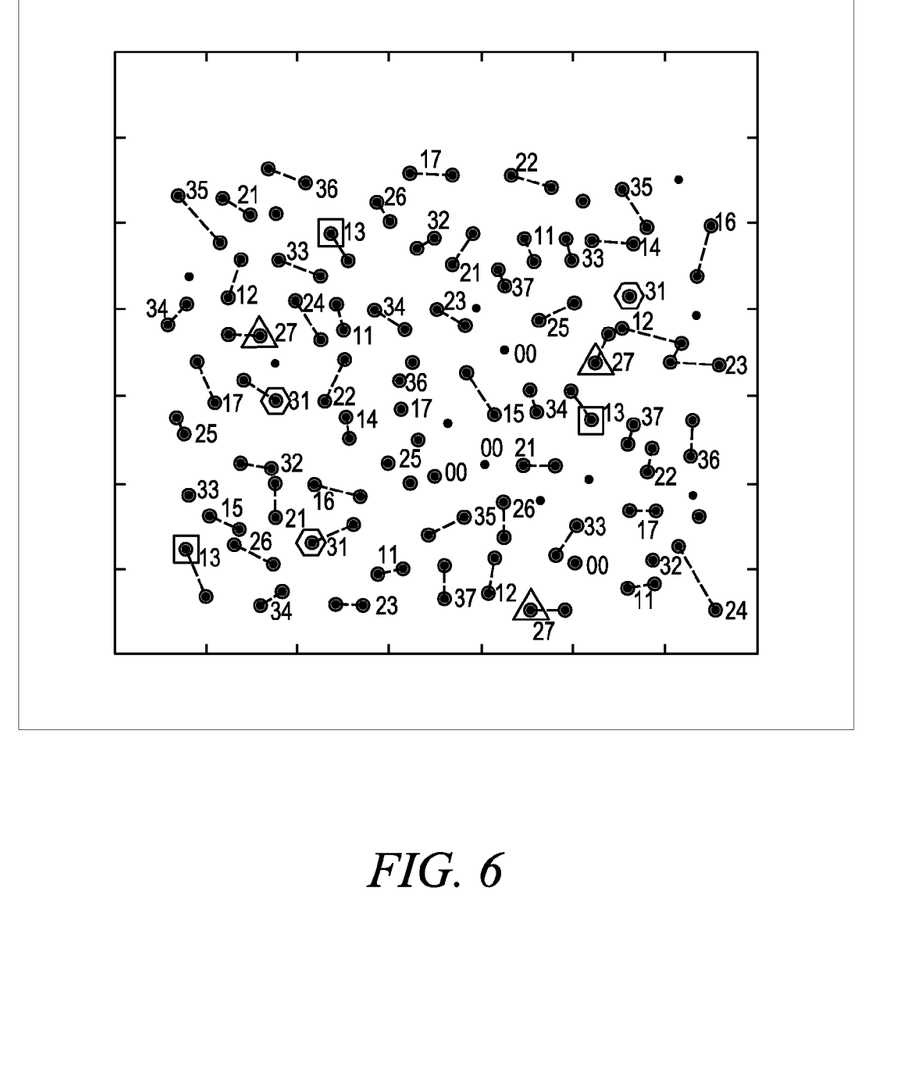
FIG. 6 illustrates is a conceptual diagram illustrating a configuration of nodes of the network shown in FIG. 3 in which channel utilization is determined based on a minimum interference technique according to an embodiment of the present invention.

FIG. 6 is a conceptual diagram illustrating a configuration of nodes 102, 106, 107 of the network 100 in which channel utilization is determined based on the technique according to the embodiment of the present invention discussed above, which can be referred to as the "minimum interference" technique. By estimating relative interference between all neighboring nodes 102, 106, 107 in the manner described above, the best code/frequency pair can be selected to ensure that planned transmissions will be able to occur. As indicated, the pathologies previously described with regard to FIGS. 1 and 2 in the Background section above are not present when this minimum interference technique is performed. Furthermore, as indicated by the triangles, squares and hexagons, the identical code/frequency pairs are used by nodes that are far apart.

In addition, tests were performed to compare the number of idle nodes out of a total of 144 equally spaced nodes in a 12-by-12 grid. An idle node is a unit that elects not to transmit any packet either because the estimated interference (incoming or outgoing) is above a certain threshold (for the "frequency collision threshold" and the "code/frequency collision threshold" methods) or because the minimum estimated interference (for the "minimum interference" method) is too high. Multiple access interference is defined here as the mean of the relative interference factors (as defined in equation 1) weighted by their respective interference coefficient (as defined in Table 2) at every node in the network. It can thus be calculated knowing the interference factor IF(l,k) and the interference coefficient $\gamma(l,k)$ between each node pair l and k, using the following formulae:

Multiple access Interference calculations      Equation 2

$$MAI_{total} = \frac{\sum_{k=1}^{N} MAI_k}{N}$$

$$MAI_k = \sum_{\substack{l=1 \\ l \neq k}}^{N} IF(l,k) \times \gamma(l,k)$$

where N is the total number of units in the network.

In this test (where the number of idle units is measured), multiple access interference is kept constant (at an arbitrary value of 0.018). Results of the testing are set forth in Table 5 below, which demonstrates that careful planning improves channel usage significantly.

TABLE 5

Number of Idle Unit

| Method | No of Idle Units |
| --- | --- |
| Frequency collision threshold | 12 |
| frequency/code collision threshold | 8 |
| Minimum interference | 5 |

An identical test was performed where the number of idle units was kept at an arbitrary value of 12 (by varying various thresholds). Table 6 below shows that multiple access interference is greatly reduced by careful frequency/code allocation, enabling higher data rates to be used.

TABLE 6

Multiple Access Interference

| Method | MAI |
| --- | --- |
| Frequency collision threshold | 0.018 |
| Frequency/code collision threshold | 0.014 |
| Minimum interference | 0.013 |

It should be further noted that the channel allocation techniques according to the embodiments of the invention discussed above are not limited to a CDMA/FDMA/TDMA combination, but could be included in any multiple-access system. Specifically, these techniques can be adapted to any multiple-access system which has various degrees of interference levels, since they provide a simple, effective way of achieving a completely automated resource reuse protocol. However, as demonstrated above, the techniques are preferably usable in systems which require resources to be dynamically allocated, such as ad-hoc networks. Additionally, the techniques can be simplified to a "frequency selection scheme" where codes are assigned randomly, as long as there is a sufficient number of codes available. Furthermore, the techniques according to the embodiments of the invention discussed above are applicable to slotted/unslotted network protocols and to unicast/multicast addressing modes.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for allocating a communication channel configuration in an ad-hoc network using spread spectrum modulation, comprising:
    collecting existing and proposed transmission information between nodes in said network;
    estimating a respective interference factor set for each existing transmission between certain of said nodes in relation to at least one proposed transmission by a transmitting node,
    wherein each said respective interference factor set includes a first estimated interference value representing an estimated interference that a respective said existing transmission imposes on said proposed transmission and a second estimated interference value representing an estimated interference that said proposed transmission imposes on said respective existing transmission;
    calculating a minimum interference factor set based on said estimated respective interference factor sets; and
    assigning said communication channel configuration to said transmitting node for said proposed transmission to another of said nodes based on said calculated minimum interference factor set.

2. A method as claimed in claim 1, wherein:
    said assigned communication channel configuration includes a frequency channel and a code channel.

3. A method as claimed in claim 1, wherein:
said estimating estimates said respective interference factor sets based on information including respective distances and path loss between said certain nodes.

4. A method as claimed in claim 1, wherein said calculating includes:
mathematically combining said first and second estimated interference values in each said respective interference factor set with coefficients associated with available transmission frequency channels and code channels to produce adjusted interference factor sets, each including adjusted first and second estimated interference values;
mathematically combining said adjusted first and second estimated interference values of said adjusted interference factor sets to produce result interference factor sets; and
selecting one of said result interference factor sets having the lowest values of all of said result interference factor sets as said minimum interference factor set.

5. A method for allocating a communication channel configuration in an ad-hoc network using spread spectrum modulation, comprising:
collecting existing and proposed transmission information between nodes in said network;
estimating a respective interference factor set for each existing transmission between certain of said nodes in relation to at least one proposed transmission by a transmitting node, wherein said estimating estimates a respective interference factor set for each existing transmission between certain of said nodes in relation to each respective proposed transmission by said transmitting node;
calculating a minimum interference factor set based on said estimated respective interference factor sets, wherein said calculating calculates a respective said minimum interference factor set based on each respective said estimated respective interference factor sets; and
assigning said communication channel configuration to said transmitting node for said proposed transmission to another of said nodes based on said calculated minimum interference factor set, wherein said assigning assigns a respective said communication channel configuration to said transmitting node for each said respective proposed transmission to another of said nodes based on said respective calculated minimum interference factor sets.

6. A system for allocating a communication channel configuration to a transmitting node in an ad-hoc network using spread spectrum modulation, the system comprising:
a memory, adapted to collect existing and proposed transmission information between nodes in said network; and
a controller, adapted to estimate a respective interference factor set for each existing transmission between certain of said nodes in relation to at least one proposed transmission by said transmitting node, to calculate a minimum interference factor set based on said estimated respective interference factor sets, and to assign said communication channel configuration to said transmitting node for said proposed transmission to another of said nodes based on said calculated minimum interference factor set,
wherein each said respective interference factor set includes a first estimated interference value representing an estimated interference that a respective said existing transmission imposes on said proposed transmission and a second estimated interference value representing an estimated interference that said proposed transmission imposes on said respective existing transmission.

7. A system as claimed in claim 6, wherein:
said assigned communication channel configuration includes a frequency channel and a code channel.

8. A system as claimed in claim 6, wherein:
said controller is adapted to estimate said respective interference factor sets based on information including respective distances and path loss between said certain nodes.

9. A system as claimed in claim 6, wherein said controller is adapted to calculate said minimum interference factor set by performing the following operations:
mathematically combining said first and second estimated interference values in each said respective interference factor set with coefficients associated with available transmission frequency channels and code channels to produce adjusted interference factor sets, each including adjusted first and second estimated interference values;
mathematically combining said adjusted first and second estimated interference values of said adjusted interference factor sets to produce result interference factor sets; and
selecting one of said result interference factor sets having the lowest values of all of said result interference factor sets as said minimum interference factor set.

10. A system as claimed in claim 6, wherein:
said controller is adapted to estimate a respective interference factor set for each existing transmission between certain of said nodes in relation to each respective proposed transmission by said transmitting node, calculate a respective said minimum interference factor set based on each respective said estimated respective interference factor sets, and assign a respective said communication channel configuration to said transmitting node for each said respective proposed transmission to another of said nodes based on said respective calculated minimum interference factor sets.

11. A computer readable medium of instructions, adapted to control an ad-hoc network using spread spectrum modulation to allocate a communication channel configuration to a transmitting node in said network, comprising:
a first set of instructions, adapted to control a processor to collect existing and proposed transmission information between nodes in said network;
a second set of instructions, adapted to control said processor to estimate a respective interference factor set for each existing transmission between certain of said nodes in relation to at least one proposed transmission by a transmitting node,
wherein each said respective interference factor set includes a first estimated interference value representing an estimated interference that a respective said existing transmission imposes on said proposed transmission and a second estimated interference value representing an estimated interference that said proposed transmission imposes on said respective existing transmission;
a third set of instructions, adapted to control said processor to calculate a minimum interference factor set based on said estimated respective interference factor sets; and a fourth set of instructions, adapted to control said processor to assign said communication channel configuration to said transmitting node for said proposed transmission to another of said nodes based on said calculated minimum interference factor set.

12. A computer readable medium of instructions as claimed in claim 11; wherein:
said assigned communication channel configuration includes a frequency channel and a code channel.

13. A computer readable medium of instructions as claimed in claim 11, wherein:
said second set of instructions is adapted to control said processor to estimate said respective interference factor sets based on information including respective distances between said certain nodes.

14. A computer readable medium of instructions as claimed in claim 11, wherein said third set of instructions is adapted to control said processor to:
mathematically combine said first and second estimated interference values in each said respective interference factor set with coefficients associated with available transmission frequency channels and code channels to produce adjusted interference factor sets, each including adjusted first and second estimated interference values;
mathematically combine said adjusted first and second estimated interference values of said adjusted interference factor sets to produce result interference factor sets; and
select one of said result interference factor sets having the lowest values of all of said result interference factor sets as said minimum interference factor set.

15. A computer readable medium of instructions adapted to control an ad-hoc network using spread spectrum modulation to allocate a communication channel configuration to a transmitting node in said network, comprising:

a first set of instructions, adapted to control a processor to collect existing and proposed transmission information between nodes in said network;

a second set of instructions, adapted to control said processor to estimate a respective interference factor set for each existing transmission between certain of said nodes in relation to at least one proposed transmission by a transmitting node, wherein said second set of instructions is adapted to control said processor to estimate a respective interference factor set for each existing transmission between certain of said nodes in relation to each respective proposed transmission by a transmitting node;

a third set of instructions, adapted to control said processor to calculate a minimum interference factor set based on said estimated respective interference factor sets, wherein said third set of instructions is adapted to control said processor to calculate a respective said minimum interference factor set based on each respective said estimated respective interference factor sets; and a fourth set of instructions, adapted to control said processor to assign said communication channel configuration to said transmitting node for said proposed transmission to another of said nodes based on said calculated minimum interference factor set, wherein said fourth set of instructions is adapted to control said processor to assign a respective said communication channel configuration to said transmitting node for each said respective proposed transmission to another of said nodes based on said respective calculated minimum interference factor sets.

* * * * *